United States Patent [19]
Adamski et al.

[11] Patent Number: 5,637,239
[45] Date of Patent: Jun. 10, 1997

[54] CURVED ELECTRODE AND METHOD FOR ELECTRICAL DISCHARGE MACHINING CURVED COOLING HOLES

[75] Inventors: Edward G. Adamski, Middletown; David A. Niezelski, Plainville; Richard H. Shaw, Groton, all of Conn.

[73] Assignee: United Technologies Corporation, Hartford, Conn.

[21] Appl. No.: 414,089

[22] Filed: Mar. 31, 1995

[51] Int. Cl.$^6$ .............. B23H 1/04; B23H 7/02; H01R 43/00; C25F 7/00

[52] U.S. Cl. .............. 219/69.15; 219/69.17; 29/889.721; 29/557; 204/212; 204/224 M; 204/292; 204/293; 205/665; 205/686

[58] Field of Search .............. 204/129.55, 224 M, 204/280, 292, 293, 212, 288; 219/69.15, 69.17; 205/665; 29/557, 558, 889.721

[56] References Cited

U.S. PATENT DOCUMENTS

| | | | |
|---|---|---|---|
| 2,902,584 | 9/1959 | Ullmann | 204/224 M |
| 3,041,442 | 6/1962 | Ullmann et al. | 219/69.15 |
| 3,056,014 | 9/1962 | Hulley et al. | 29/889.721 X |
| 3,306,838 | 2/1967 | Johnson | 204/129.55 X |
| 3,719,569 | 3/1973 | Gosger | 204/129.55 |
| 4,002,518 | 1/1977 | Shaw | 156/154 |
| 4,128,928 | 12/1978 | Shotts et al. | 29/156.8 B |
| 4,197,443 | 4/1980 | Sidenstick | 219/69.15 |
| 4,250,011 | 2/1981 | Capello et al. | 204/224 M |
| 4,584,451 | 4/1986 | Inoue | 219/69.12 |
| 4,650,949 | 3/1987 | Field | 219/69 E |
| 4,762,464 | 8/1988 | Vertz et al. | 29/889.721 X |
| 4,769,118 | 9/1988 | Johns | 205/665 |
| 4,819,325 | 4/1989 | Cross et al. | 29/825 |
| 4,827,675 | 5/1989 | Andrews | 51/281 R |
| 4,855,557 | 8/1989 | Denny | 219/69.15 |
| 5,029,759 | 7/1991 | Weber | 219/69.17 |
| 5,051,559 | 9/1991 | Wells | 29/558 X |
| 5,152,059 | 10/1992 | Midgley | 29/889.721 X |
| 5,209,759 | 7/1991 | Weber | 239/533.12 |
| 5,281,084 | 1/1994 | Noe et al. | 415/115 |

*Primary Examiner*—Donald R. Valentine
*Attorney, Agent, or Firm*—Christine M. Wilkes

[57] ABSTRACT

An electrode for use in a rotary electrical discharge machining (EDM) device for producing at least one curved hole in an article includes at least one curved tooth. The curved tooth lies in a plane. A perpendicular line to that plane is parallel to the axis of rotation on the rotary EDM device. At least one curved cooling hole is machined in the article.

3 Claims, 1 Drawing Sheet

5,637,239

CURVED ELECTRODE AND METHOD FOR ELECTRICAL DISCHARGE MACHINING CURVED COOLING HOLES

TECHNICAL FIELD

The present invention relates generally to EDM electrodes, and particularly to curved electrodes for electrical discharge machining curved holes.

BACKGROUND INFORMATION

Gas turbine engines operate at high rotational speeds and high temperatures for increased performance and efficiency. The demand for greater efficiency requires gas turbine engines to operate at gas temperatures in excess of about 2750° F. (1510° C.). Direct exposure to this high temperature gas, however, detrimentally affects turbine airfoils by causing component distortion and even melting in extreme cases.

Airfoil cooling techniques have been developed to keep the metal temperature of the airfoils within design limits while operating in a high temperature environment. Convection and/or film cooling are techniques used in the design of air-cooled turbine airfoils. Improved convection cooling is obtained by using such devices as fins, pins, and narrow multi-pass channels to increase heat transfer surface area inside the airfoil. Convection cooling can also be enhanced by the impingement of high velocity cooling air on the hot airfoil surfaces.

In film cooling, cool air is fed through holes in the airfoil wall to form an insulating layer between the hot gases and the airfoil surface. Since air has a very low thermal conductivity, it is an effective insulation medium. If, however, the cool air exits the holes at too steep an angle to the airfoil surface or at too great a velocity it will blow away from the airfoil surface and be ineffective in cooling the airfoil surface. Effective cooling requires the air to exit the holes at a low angle and low velocity to the airfoil surface.

Turbine airfoil designers rely on several standard cooling hole geometries to obtain cooling. These geometries include round, rectangular, conical, and shaped or "diffuser" holes. Such standard hole geometries, however, cannot sufficiently cool turbine airfoils to survive in an environment where temperatures can reach 3000° F. (1649° C.). More advanced shaped cooling holes, such as curved cooling holes, may provide a significant reduction in airfoil metal temperature and thus greatly improve turbine airfoil cooling. Accordingly, there is a need for complex-shaped cooling holes, such as curved cooling holes, to increase turbine airfoil film cooling effectiveness.

DISCLOSURE OF THE INVENTION

The present invention is directed to the satisfaction of the above needs. According to the present invention, a novel electrode for producing curved holes in conductive articles, such as gas turbine engine components, is disclosed. In accordance with one embodiment of the present invention, an electrode for use in a rotary electrical discharge machining device for producing a curved hole in an article includes a curved tooth attached to a supporting member. The curved tooth lies in a plane. A perpendicular line to that plane is parallel to the axis of rotation on the rotary electrical discharge machining device for production of a curved hole.

In accordance with one particular embodiment of the present invention, an electrode having a plurality of curved teeth is positioned in a tool holder on a rotary electrical discharge machining device having a rotational EDM axis. A plurality of curved holes are electrically discharged machined in the metallic work piece.

An advantage of the present invention is the ability to form complex-shaped holes, such as curved cooling holes in a turbine airfoil. Curved cooling holes increase turbine airfoil film cooling effectiveness because cool air exists the curved holes at a low angle to the airfoil surface. Heat transfer is also increased due to the curved geometry.

The foregoing features and advantages of the present invention will become more apparent in light of the following detailed description of the best mode for carrying out the invention and in the accompanying drawings.

BEST MODE FOR CARRYING OUT THE INVENTION

According to the present invention, a novel curved electrode for use in an electrical discharge machining (EDM) device for producing curved holes in superalloy articles is disclosed. In as much at it is well known in the art to produce holes in metallic articles by EDM using conventional electrodes, details of the process will not be described herein. Specific details can be found in U.S. Pat. No. 4,197,443 (Sidenstick), which is incorporated herein by reference.

Figure 1:
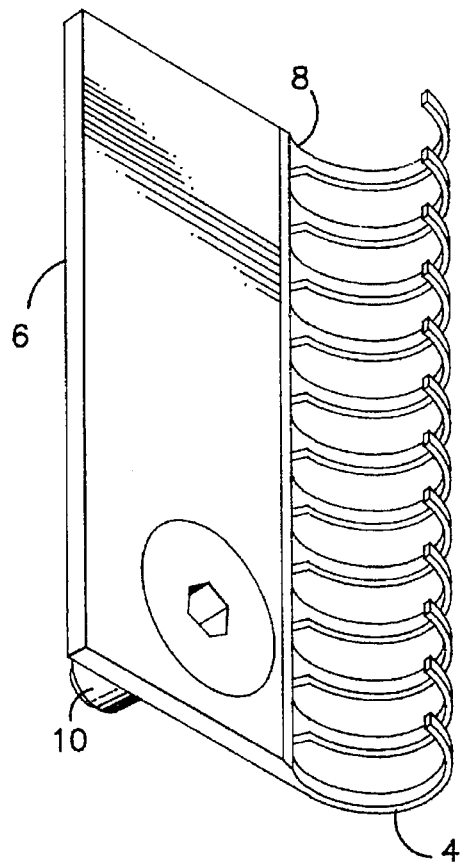
FIG. 1 shows an electrode having a plurality of curved teeth and a flat supporting member.

In accordance with one embodiment of the present invention, a curved electrode 2 for the electrical discharge machining of curved cooling holes in metallic articles is disclosed, as shown in FIG. 1. The electrode 2 of the present invention comprises at least one shaped, curved tooth 4 to facilitate formation of a curved hole. A supporting member 6 may be attached to the curved tooth 4. Any conventional means of making the curved electrode 2, such as stamping and coining, may be employed. Preferably, the electrode 2 is made by wire electrical discharge machining.

The curved electrode 2 may be made from a conductive material such as copper or copper alloys. The curved electrode 2 may also be made from graphite, copper-tungsten, gold, silver, tin, platinum, lead, zinc, iron, nickel, brass or combinations thereof. Preferably, the curved electrode 2 is copper or copper tungsten.

The curved electrode 2 may also include a diffuser section 8. In this case, the curved tooth 4 includes an enlarged portion which forms the diffuser section 8. The diffuser section 8 may be any shape such that a resulting hole has enhanced diffusion of fluid through the hole. For example, the diffuser section 8 may be triangular-shaped or curved.

A plurality of curved teeth may be attached to the supporting member 6 to form a plurality of curved holes. The thickness, length and radius of curvature of the curved teeth are dependent on work piece size and desired curved hole geometry.

The supporting member 6 to which at least one curved tooth 4 is attached may be any shape which provides appropriate electrical discharge machining airfoil clearances. For example, the supporting member 6 may be a flat, plate-like structure. The supporting member 6 of the electrode 2 is attached to a tool holder on a rotary EDM device so that the electrode 2 is placed in close proximity to the work piece. The supporting member 6 may be attached by means such as a screw 10. The curved teeth of the electrode 2 lie in a plane. A perpendicular line to that plane is parallel to the axis of rotation on the rotary electrical discharge machining device. Rotation of the electrode 2 must be concentric with the rotary EDM axis to ensure generation of a true curved hole (coaxial centerlines). At least one curved hole is machined in a work piece.

Figure 3:
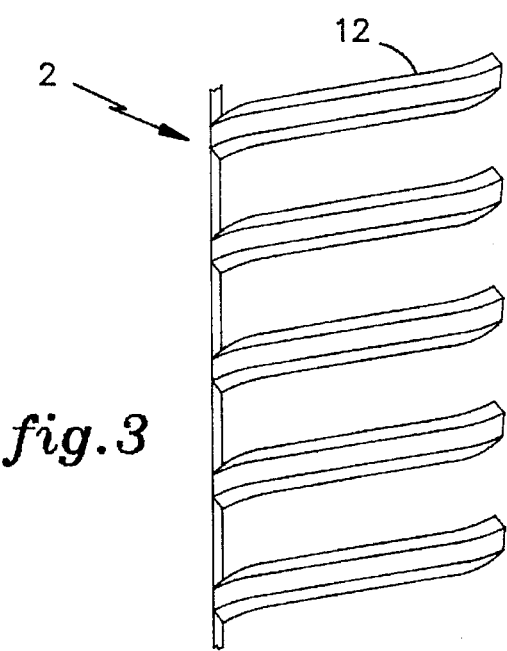
FIG. 3 shows an electrode having a plurality of curved, helical teeth.

In yet another embodiment of the present invention, a curved, helical hole(s) may also be machined in the work piece. Helical cooling holes may be produced by simultaneously rotating the electrode 2 including at least one curved, helical tooth 12 (shown in FIG. 3) about an axis and advancing the tooth 12 along the axis and into the work piece. Thus, it is necessary to control both rotational (C-axis) and vertical (Z-axis) servo motions on the rotary EDM device.

Figure 2:
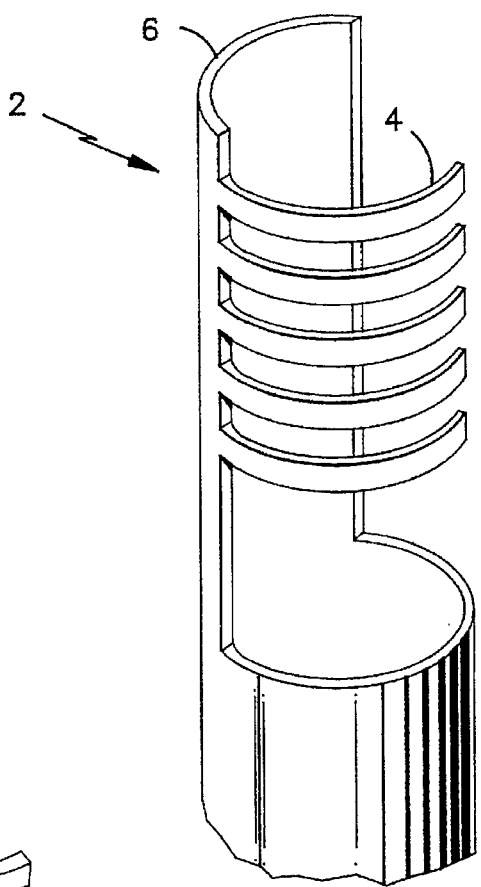
FIG. 2 shows an electrode having a plurality of curved teeth and a tubular supporting member.

The present invention will now be described by way of example which is meant to be exemplary rather than limiting. A curved comb electrode, as shown in FIG. 2, was used to produce curved holes in a metallic work piece. The electrode included five individual curved teeth 0.030 inches in width; 0.012 inches thick; and tooth spacing of 0.040 inches (center to center tooth spacing was 0.070 inches). Copper Tungsten (CuW) was selected for the electrode material because of its superior strength, wear characteristics and machinability.

The electrode was produced from a 0.257 inch diameter CuW rod. A rod segment 2.5 inches in length was fixtured on an engine lathe. A tubular section of the rod was then formed on the engine lathe. Fabricating the delicate electrode teeth from the tubular section was accomplished by wire EDM. The CuW rod was mounted on the worktable of the wire EDM machine such that its axis was normal to the traversing wire. A chordal segment was removed by cutting 0.050 inches in a radial direction and then cutting parallel to the rod axis. Machining was stopped, and the cylindrical work piece was rotated 60 degrees about its axis. This rotation brought the intersection point between the electrode and the supporting member to the twelve o'clock position. Next, the five electrode teeth were generated by activating a NC program to machine a series of radial cuts. A Charmilles Robifil 200 wire EDM machine was utilized to perform the above operation.

Curve hole drilling was performed with the use of a Mitsubishi V35F EDM device. This particular unit was equipped with a System 3R rotary servo unit for curvilinear machining. The servo unit contained a hydraulic chuck which was utilized to affix a 0.250 inch collet tool holder to the machine. The collet tool holder provided an accurate means of locating the CuW comb electrode on the centerline of the rotational EDM axis.

The EDM drilling procedure began by clamping a test bar of a single crystal nickel-base superalloy to the worktable. Next, a curved electrode, as shown in FIG. 2, was secured in the collet tool holder and fastened to the rotary servo via a hydraulic chuck. The touch-sensing capabilities of the V35F were then utilized to position the centerline of the EDM axis and establish the machining start position. The zero position for the EDM or C-axis was set with the electrode teeth contacting the surface of the test bar. Prior to initiating EDM, the electrode was rotated away from the part surface by 1 degree. After establishing the electrode-to-work piece gap, the cutting zone was submerged in a circulating bath of dielectric oil, and the EDM cycle commenced. The final machining position was programmed at a rotation angle of 130 degrees. Five curved holes were produced in the test bar.

Accordingly, the feasibility of machining curved holes in a metallic article using a rotary EDM device and a curved, comb electrode was demonstrated. The machining rate for the rotary EDM process was comparable to conventional EDM of round or shaped film hole geometries of equivalent hole length. Moreover, testing indicated the ability to control airflow within ±10%; this indicates that the process is capable of meeting present day airfoil design requirements.

However, the tubular supporting member design utilized to evaluate the rotary EDM process may not provide the necessary flexibility and/or clearances for turbine airfoil applications. Thus, Applicants suggest fabricating a supporting member which will provide the necessary clearances for turbine airfoils. For example, an electrode with a flat, plate-like supporting member, as shown in FIG. 1, may be used. The flat supporting member may be secured to a tool holder by means, such as screws.

An advantage of the present invention is that the geometry of the curved holes produced with the curved, CuW comb electrodes was highly repeatable.

Yet another advantage of the present invention is the ability to produce curved cooling holes in gas turbine engine components. Curved cooling holes enhance film cooling effectiveness because cool air exits curved cooling holes at a low angle to the airfoil surface.

Although the invention has been shown and described with respect to detailed embodiments thereof, it should be understood by those skilled in the art that various changes in form and detail may be made without departing from the spirit and scope of the claimed invention.

We claim:

1. An electrode for use in a rotary electrical discharge machining device for producing at least one curved hole in an article, the electrode comprising at least one curved tooth and a supporting member attached to the tooth, wherein the curved tooth includes an enlarged portion which forms a diffuser section and the supporting member of the electrode is positioned in a tool holder on the rotary discharge machining device, the device having a rotational electrical discharge machining axis, such that the tooth lies in a plane, a perpendicular line to the plane is parallel to the axis of rotation, wherein the electrode is made of a material selected from the group consisting of copper, copper alloys, graphite, gold, silver, tin, platinum, lead, zinc, iron, nickel brass, and combinations thereof.

2. A method of producing a curved, electrically discharge machined cooling hole in a gas turbine engine component, the method comprising the steps of:

(a) fabricating a curved electrical discharge machining electrode by wire EDM; and (b) rotating the curved electrical discharge machining electrode, having no outer tube structure surrounding the electrode, about an axis perpendicular to the plane of the electrode and into the gas turbine engine component, the electrode consisting essentially of at least one curved tooth and a supporting member attached to the tooth, wherein the supporting member of the electrode is positioned in a tool holder on the rotary discharge machining device, the device having a rotational electrical discharge machining axis, such that the tooth lies in a plane, a perpendicular line to the plane is parallel to the axis of rotation, wherein the electrode is made of a material selected from the group consisting of copper, copper alloys, graphite, gold, silver, tin, platinum, lead, zinc, iron, nickel brass, and combinations thereof.

3. A method of producing a curved, helical cooling hole in a gas turbine engine component comprising the steps of fabricating an electrode consisting essentially of at least one curved, helical tooth, by wire EDM and simultaneously rotating the electrode about an axis and advancing the tooth along the axis and into the component, without the use of an outer tube structure surrounding the electrode.

* * * * *